May 22, 1962  K. A. W. KEMP ETAL  3,035,523
VARIABLE DELIVERY PUMPS
Filed Dec. 27, 1960  8 Sheets-Sheet 6

United States Patent Office 3,035,523
Patented May 22, 1962

3,035,523
VARIABLE DELIVERY PUMPS
Kenneth Albert Walters Kemp, Ealing, London, and Keith Finer Hutcheon, Denham, England, assignors to C.A.V. Limited, London, England
Filed Dec. 27, 1960, Ser. No. 78,552
Claims priority, application Great Britain Dec. 31, 1959
7 Claims. (Cl. 103—44)

This invention relates to variable delivery pumps more particularly but not exclusively for use as liquid fuel pumps for internal combustion engines.

The object of the invention is to provide such a pump in a convenient form.

A variable delivery pump according to the invention comprises a shuttle movable in a bore and in part defining at opposite sides thereof a pair of chambers, a member reciprocable in one of the chambers during alternating filling and discharge strokes, adjustable valve means for proportioning the simultaneous flow to the two chambers during at least part of the filling stroke, further valve means for controlling an outlet from the other chamber, and a spill port arranged to be uncovered by the shuttle at a predetermined position of the shuttle during a discharge stroke of the member so as to permit escape of fluid from said one chamber and thereby terminate discharge from the other chamber.

Figure 4:
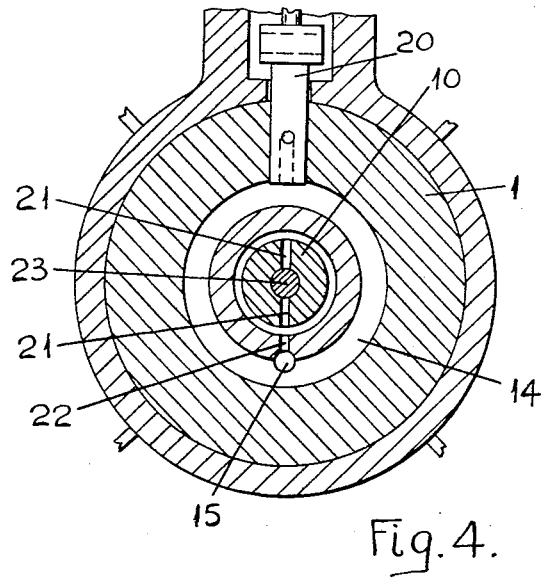
FIGURE 4 is a section on the line A—A of FIGURE 3.
Figure 5:
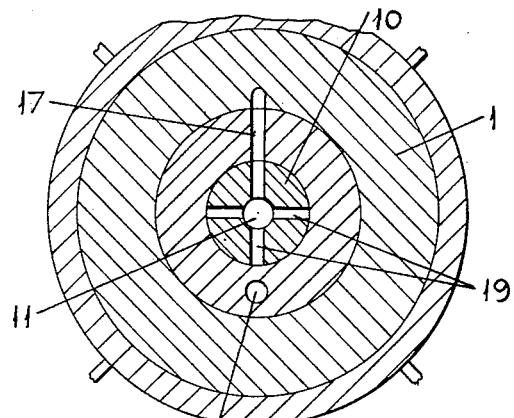
FIGURE 5 is a section on the line B—B of FIGURE 3.
Figure 6:
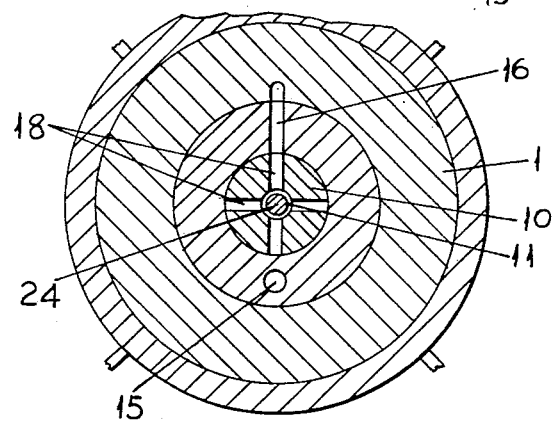
FIGURE 6 is a section on the line C—C of FIGURE 3.
Figure 7:
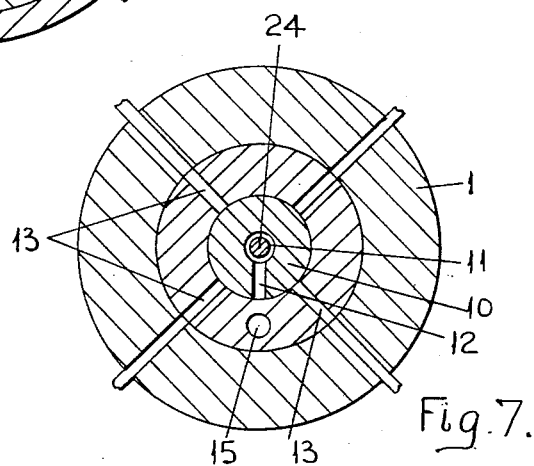
FIGURE 7 is a section on the line D—D of FIGURE 3.
Figure 8:
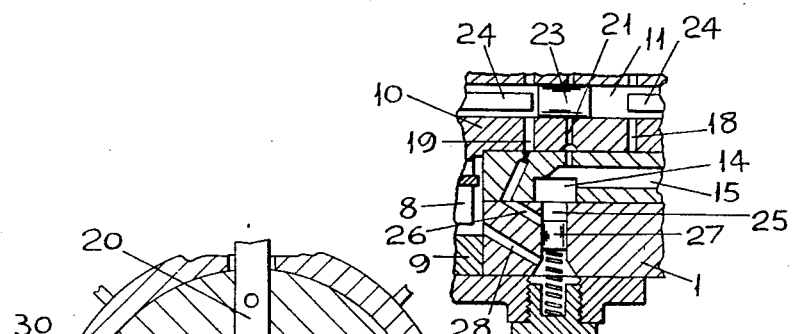
FIGURE 8 is a fragmentary sectional side view showing a modification.
Figure 9:
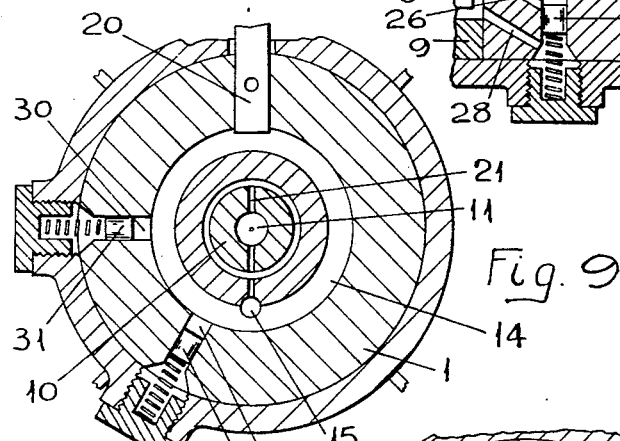
Figure 10:
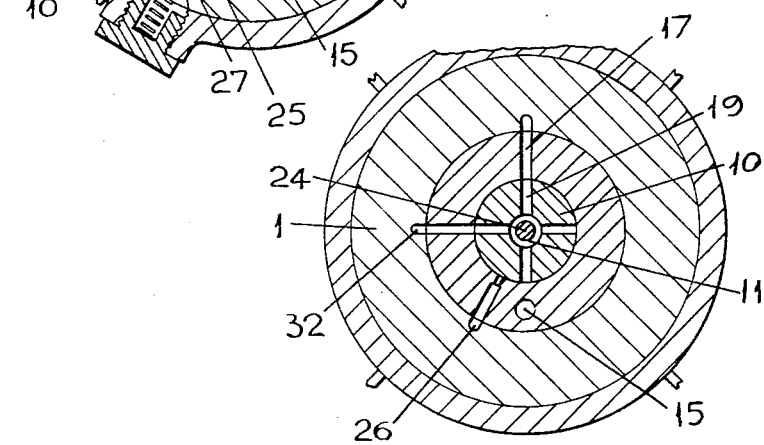

FIGURES 9 and 10 respectively are sections similar to FIGURES 4 and 5 showing the modification shown in FIGURE 8 in combination with a further modification.

Figure 11:
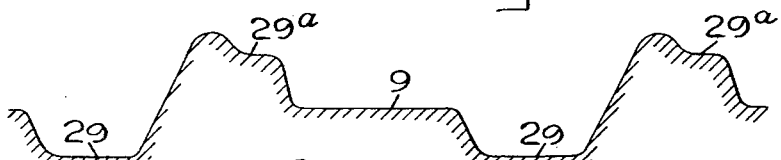

FIGURE 11 is a developed view of a portion of the cam for use with the modification shown in FIGURE 8.

Figure 12:
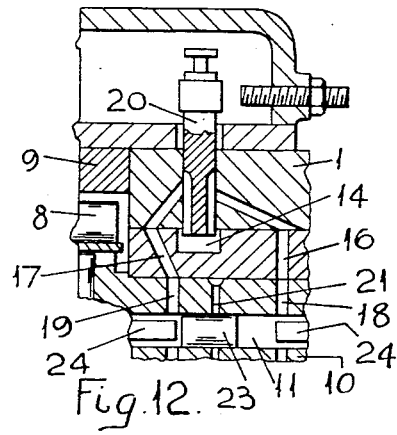
Figure 13:
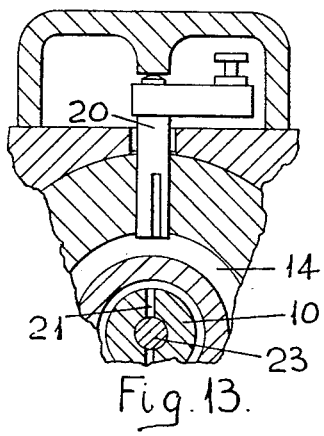
Figure 14:
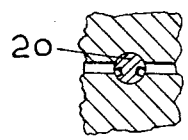
Figure 15:
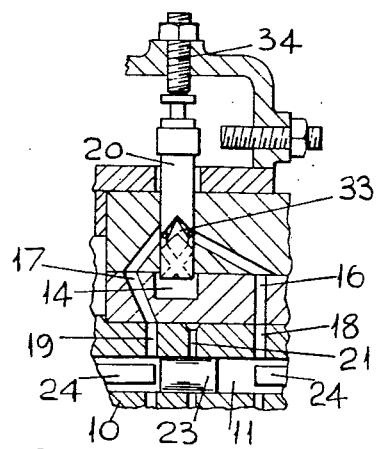
Figure 16:
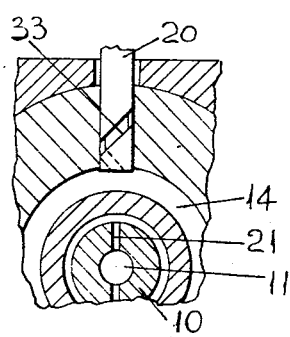
Figure 17:
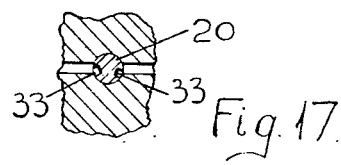

FIGURES 12, 13 and 14 respectively are fragmentary sectional side, end, and plan views of an alternative form of throttle, FIGURES 15, 16 and 17 respectively are fragmentary sectional side, end, and plan views of a further alternative form of throttle.

Figure 18:
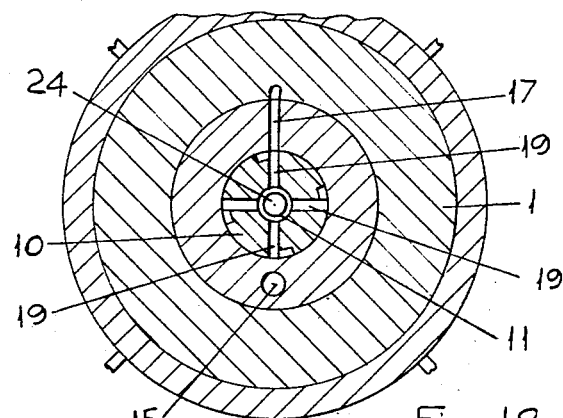

FIGURE 18 is a view similar to FIGURE 5 showing a further modification of the invention.

Figure 3:
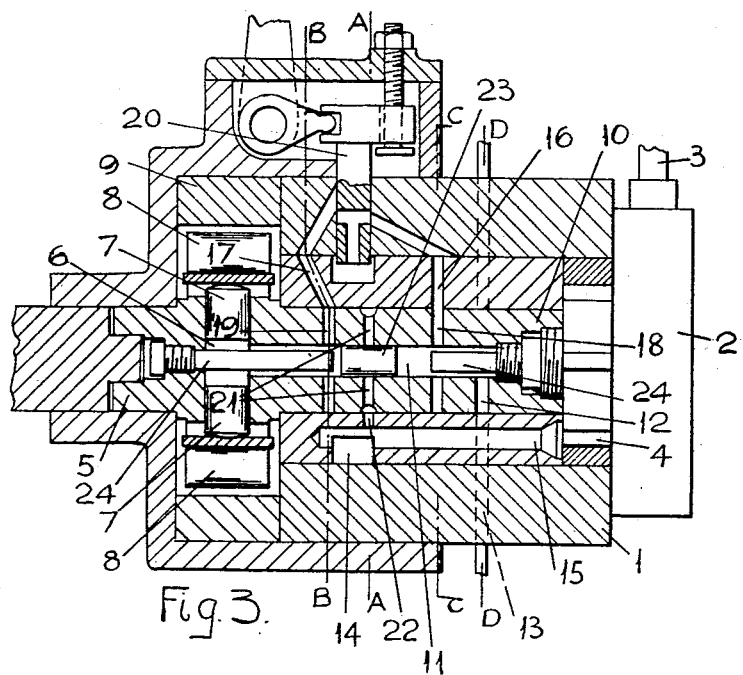
FIGURE 3 is a sectional side view of further example of the invention.
Figure 19:
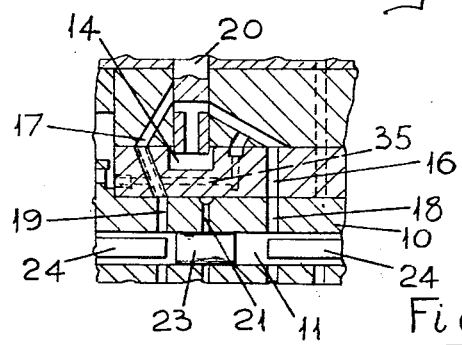
Figure 20:
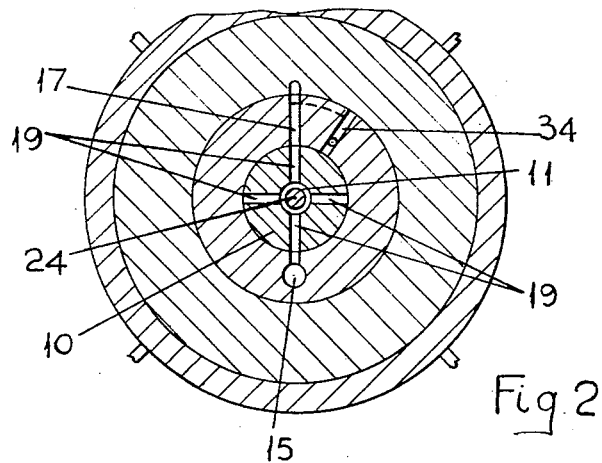
Figure 21:
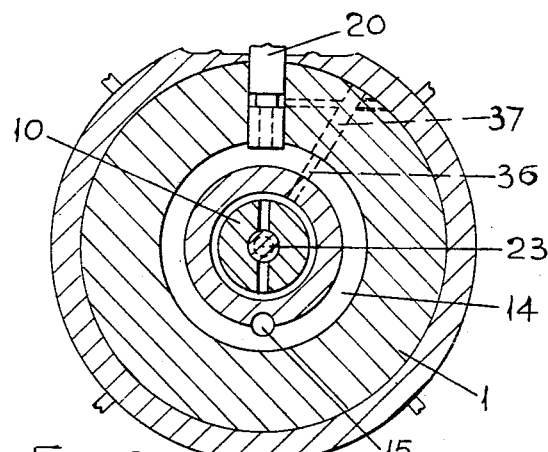
Figure 22:
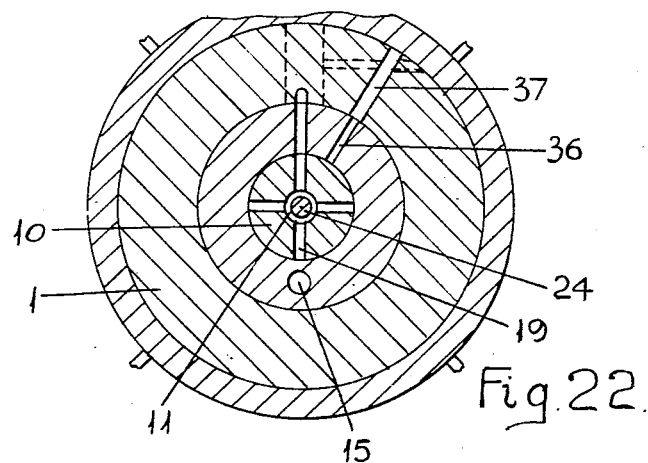

FIGURES 19 and 20 respectively are a fragmentary sectional side view similar to FIGURE 3, and a cross-section similar to FIGURE 5 showing a still further modification of the invention, and FIGURES 21 and 22 are views similar to FIGURES 4 and 5 showing yet another modification of the invention.

Figure 1:
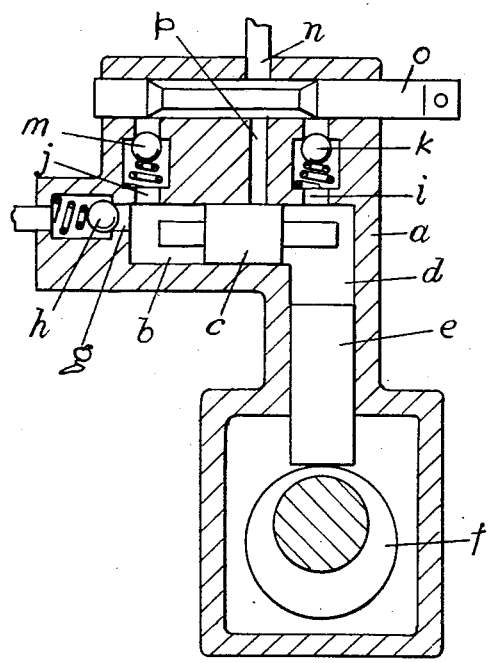
FIGURE 1 is a sectional side view of one example of the invention.

In FIGURE 1 the invention is illustrated as applied to a simple form of fuel injection pump for use with a single cylinder internal combustion engine.

Referring first to this example of the invention there is provided a body part $a$ in which is formed a bore $b$ containing an axially movable cylindrical shuttle $c$, the shuttle having projections at its ends which in conjunction with the ends of the bore $b$ serve to limit its permitted movement. One end of the bore $b$ is in communication with a second bore $d$ extending at right angles in the body part. In the bore $d$ is a plunger $e$ which is arranged to be actuated by a cam $f$ driven by the engine.

The shuttle $c$ therefore, in part defines and separates two chambers within the body part. One chamber, hereinafter termed the working chamber, is within adjacent ends of the bore $b$, $d$ and the other chamber (hereinafter termed the delivery chamber) is in communication with an outlet $g$ in the body part. The outlet $g$ incorporates a non-return valve $h$ and is adapted for connection to the engine cylinder.

At opposite sides of the shuttle $c$ a pair of inlets $i$, $j$ open into the working and delivery chambers respectively. The inlets $i$, $j$ incorporate non-return valves $k$, $m$ respectively, and are both in communication with a main fuel inlet $n$ through a valve having an axially movable member $o$ whereby the flow through the inlets $i$, $j$ can be proportioned. Moreover, the inlet $n$ is also in communication with a spill port $p$ which is arranged to be uncovered by the shuttle $c$ when the latter reaches a predetermined position in the bore $b$.

Fuel is supplied to the inlet $n$ by any convenient means at a pressure less than that required for injection, and the pump operates in the following manner. Assuming that both chambers are filled with fuel and the plunger $e$ is at bottom dead centre, then as the plunger moves inwardly in its bore $d$ in a discharge stroke, the shuttle $c$ will be displaced to the left as viewed in the drawing, thereby discharging fuel from the delivery chamber to the engine cylinder through the outlet $g$ until the spill port $p$ is uncovered. At this stage fuel can escape from the working chamber and injection ceases. When the cam passes top dead centre fuel can flow simultaneously to the two chambers in proportions predetermined by the setting of the valve member $o$, thereby moving the shuttle to the right as viewed in the drawing and moving the plunger $e$ outwardly through its filling stroke as permitted by the cam, whereafter the cycle is repeated.

When the proportion of fuel fed to the working chamber is high in relation to that fed to the delivery chamber the shuttle $c$ will be moved to the right through a relatively small distance, with the result that the spill port $p$ will be uncovered early in the next discharge stroke thereby feeding a smaller quantity of fuel to the engine than when the proportions are reversed.

In the illustrated example it will be seen that the member $o$ is arranged to increase the flow to the one chamber whilst reducing the flow to the other. However, the same result can be achieved by providing a restricted inlet to one chamber and controlling the flow to the other chamber by a simple throttle valve so as to proportion the flow.

Figure 2:
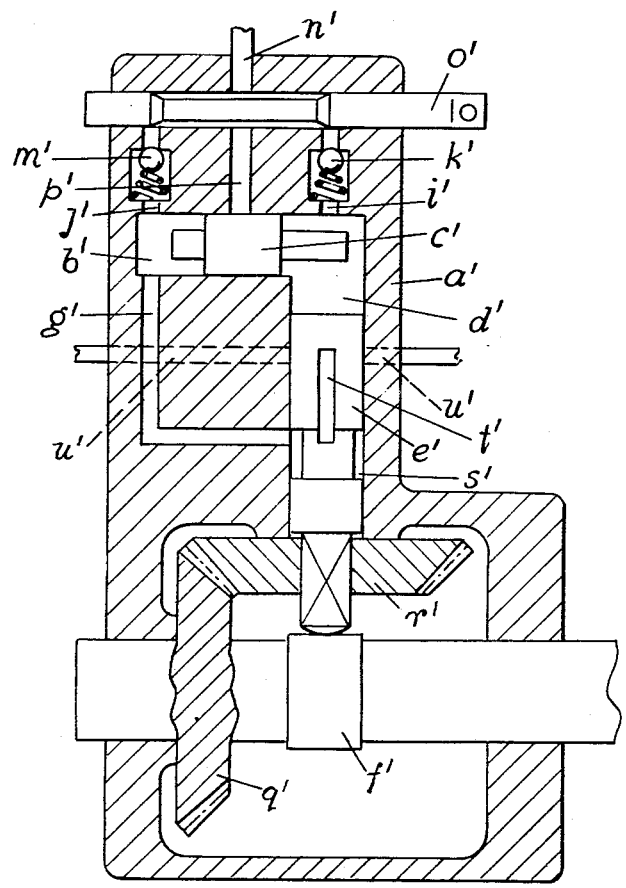
FIGURE 2 is a sectional side view of another example of the invention.

FIGURE 2 illustrates the invention applied to a generally known form of pump for use with a four cylinder engine, and since the construction and working of this pump is partially similar to that shown in FIGURE 1 parts similar to those in FIGURE 1 will be given the same reference letters with the suffix 1, and only the differences in the two constructions will be described.

In this example the cam $f^1$ has four lobes whereby the plunger $e^1$ will be caused to partake of four reciprocations during each revolution of the cam. Also the cam shaft is connected to the plunger $e^1$ through gearing $q^1$, $r^1$ whereby the plunger $e^1$ will be rotated once for each revolution of the cam. In the plunger $e^1$ is an annular peripheral groove $s^1$ which is in permanent communication with the outlet $g^1$ from the delivery chamber, the non-return valve $h$ being omitted. Moreover extending longitudinally in the periphery of the plunger $e^1$ from the groove $s^1$ is a groove $t^1$ which, as the plunger $e^1$ rotates, registers with each in turn of four equi-angularly spaced ports $u^1$ (two only of which are seen in the drawing) leading to the cylinders of the engine. The timing is such that during each discharge stroke of the plunger $e^1$ the groove $t^1$ registers with one of the ports $u^1$ so that the plunger constitutes a rotary distributor.

Referring now to the example shown in FIGURES 3 to 7 of the drawings there is provided a body part 1 which at one end contains a feed pump 2. This pump has an inlet 3 and an outlet 4 formed in the body part, the inlet and outlet being interconnected by a spring-loaded relief valve (not shown) which regulates the pressure which is generated by the pump to a pressure which varies with speed.

At the other end of the body part is contained an injection pump which includes a rotary head 5 having formed in it a transverse bore 6. The bore extends diametrically through the head and contains a pair of reciprocable plungers 7. As the head rotates each plunger is moved inwardly at an appropriate timing by the interaction of a roller 8 at its outer end with a surrounding annular cam 9. Alternatively each plunger 7 may be movable inwardly by the interaction of a cam surface at its outer end with a plurality of equi-angularly spaced rollers mounted within recesses in the internal periphery of a surrounding annulus, this annulus together with its rollers being herein referred to as an annular cam. In a further modification the bore 6 may extend only part way through the head and contain a single plunger 7.

The rotary parts of the feed and injection pumps are interconnected by a cylindrical distributor 10 and are adapted to be driven as a unit by the engine. In the distributor is formed an axial bore 11 which at one end is in communication with the bore 6 in the head, and which at its opposite end is in communication with a radial delivery passage 12 formed in the distributor. The delivery passage 12 communicates as the distributor rotates, with each in turn of a plurality of angularly spaced delivery ports 13 in the body part, the delivery ports 13 being adapted for connection to the plurality of engine cylinders respectively.

In the body part 1 is an annular chamber 14 to which fuel is supplied from the feed pump through a feed passage 15 at a pressure which varies with speed. Fuel can flow from the chamber 14 through passages in the body part to either of a pair of supply ports 16, 17 in the body part. As the distributor rotates fuel can flow from the supply port 16 to each in turn of a plurality of supply passages 18 in the distributor, there being as many supply passages as there are engine cylinders. The supply passages 18 are radially disposed and angularly spaced and communicate at their inner ends with the bore 11 of the distributor near the end incorporating the delivery passage 12. Fuel can flow from the other supply port 17 in the body part to the bore 11 of the distributor near the end remote from the delivery passage 12 through a further plurality of supply passages 19 in the distributor. Moreover, the supply passages 18, 19 are arranged to register with the ports 16, 17 respectively when the distributor is angularly displaced from positions in which the passage 12 registers with the ports 13.

The flow of fuel from the chamber 14 to the supply ports 16, 17 is controlled by an axially adjustable throttle 20. The throttle 20 serves to proportion the total fuel charge to the two supply ports 16, 17 in accordance with its position, in such a manner that the supply to port 16 is reduced as the supply to port 17 is increased and vice versa. The total fuel charge to the bore 11 in the distributor is determined by the permitted movement of the plungers 7 which is limited by the pitch circle of the cam, and is therefore constant irrespective of the setting of the throttle 20.

Within the distributor 10 at a position between the supply passages 18, 19 is a pair of diametrically opposed spill passages 21 terminating in an annular groove which communicates with the feed passage 15 leading to the annular chamber 14 through a spill port 22 in the body part.

In the bore 11 in the distributor at a position between the inner ends of the passages 18, 19 is a cylindrical shuttle 23 which is movable axially in the bore 11 in the manner of a piston. Axial movement of the shuttle is limited by any convenient means such as screw-threaded stop 24, engaged at opposite ends of the bore so that the shuttle can never move into a position to cover either of the supply passages 18, 19.

In order to understand the operation of the pump let it be assumed that the shuttle 23 is at the limit of its stroke at a position remote from the injection pump. In this position the shuttle uncovers the spill passages 21 at its side open to the injection pump. As the distributor rotates the supply passages 18, 19 register simultaneously with the supply ports 16, 17 respectively in the body part, and as a result fuel flows from the annular chamber 14 to the bore in the distributor at each side of the shuttle in proportions determined by the setting of the throttle 20. The fuel fed to the side of the shuttle remote from the injection pump serves to move the shuttle towards the injection pump by a distance dependent on the quantity of fuel fed to that side of the shuttle. This movement of the shuttle serves also to cover the spill ports 21. The fuel fed to the bore at the side of the shuttle nearer the injection pump moves the plungers 7 thereof outwardly. The cam 9 is so shaped that when the delivery passage 12 in the distributor registers with a delivery port 13 the plungers are moved inwardly by their interaction with the cam, thereby causing the shuttle 23 to be moved away from the injection pump. As a result, since the port 16 is not in register with a passage 18, fuel will be discharged from the side of the shuttle remote from the injection pump to the appropriate engine cylinder, until the shuttle uncovers the spill passages 21 and permits escape of fuel from its side nearer the injection pump to the annular chamber 14. Thereafter the cycle of action is repeated to feed fuel in turn to each of the engine cylinders.

It will be understood that, since the plungers will always be moved outwardly to a predetermined extent the quantity of fuel fed to the engine will be dependent solely upon the amount of fuel fed to the side of the shuttle remote from the injection pump, this quantity being in turn dependent on the setting of the throttle 20, which can be determined by a governor and/or by manually operable means.

Referring to FIGURES 8 to 10 in a modification, the pump may include a device for regulating the commencement of the injection stroke in accordance with the feed pressure. For this purpose, extending within the body part is a valve passage 25 opening at its inner end into the annular chamber 14. From a position adjacent the inner end of the valve passage extends a port 26 which can communicate with the supply passages 19 in the distributor in turn as the latter rotates.

Within the valve passage 25 is a spring-loaded piston 27 which normally covers the port 26, but which can be moved by the feed pressure to uncover the port 26 by an amount dependent on the feed pressure, the outer end of the valve passage 25 being subjected to inlet pressure of the pump through a passage 28. The arrangement is such that the port 26 communicates with the bore 11 in the distributor through each supply passage 19 in turn after these passages have been in communication with the chamber 14 through the throttle 20. The cam 9 is formed with reliefs 29 (see FIGURE 11) in advance of its lobes 29a respectively, and hence the effect of the additional charge fed through the port 26 is to move the plungers 7 further outwardly into the reliefs 29 by an amount dependent on the feed pressure. As a result the cam lobes 29a will contact the plungers, and thereby inject fuel to the engine, at an instant dependent on how far the plungers have been moved outwardly, by the feed pressure.

In a further modification, which may be employed independently, but as shown in FIGURES 9 and 10 is employed together with the first modification, a further valve passage 30 similar to the passage 25 and incorporating a spring loaded piston 31 is arranged to establish communication between the chamber 14 and the passages 19 in turn through a port 32 at the same time as the supply ports 16, 17 controlled by the throttle 20. Assuming that the throttle is set in a predetermined position, this modification serves to supply to the bore at the side of the shuttle nearer the injection pump, a quantity of fuel dependent on feed pressure (i.e. the speed of the engine). However, the total quantity of fuel fed to the bore in the distributor is constant during the period when the passages 18, 19 are in register with the ports 16, 17, 32 as determined by the permitted movement of the plungers which is limited by the pitch circle of the cam. Hence the amount of fuel flowing through the throttle decreases, and, since the throttle proportions the flow to opposite sides of the shuttle, the amount of fuel fed to the engine will decrease with increasing speed. If desired, however, the piston 31 can be arranged to close the port 32 as the speed increases, thus increasing the fuel fed to the engine with increasing speed.

Although in FIGURE 3 the throttle is shown as being axially adjustable to proportion the flow of fuel to the ports 16, 17 it is clear that an angularly adjustable throttle as shown in FIGURES 12 to 14 could be used, the operation of this throttle being apparent from an examination of the drawings. Moreover, if desired, in any of the examples above described the throttle 20 may include a cylindrical plug in which are formed a pair of opposite hand helical grooves 33 as shown in FIGURES 15 to 17, whereby the required proportions can be obtained by angular movement of the plug. The plug is also axially adjustable by a screw 34 to adjust the response to governor control generally known as "run up."

In a further modification the pump is as described with reference to FIGURES 3 to 7 except that a cam as shown in FIGURE 11 is used and the passages 19 are widened at their outer ends as shown in FIGURE 18 so as to remain in communication with the port 17 after the corresponding passages 18 have moved out of register with the port 16. By this modification an additional charge of fuel can be fed to the injection pump to move the plungers into the reliefs 29 and thereby advance the instant of injection. When the engine is operating at a given speed on light loads, the throttle 20 will be moved to a position such that the delivery to the port 17 is large as compared with the delivery to the port 16. Thus the effect will be to advance the injection with respect to conditions when the engine is operating at the same speed with a relatively heavy load, since in the latter case the quantity of fuel fed to the port 17 is small as compared with that fed to the port 16.

If an inverse effect is required (i.e. that the injection should be retarded on light loads as compared with heavy loads) this can be achieved by the modification shown in FIGURES 19 and 20 where a separate timing port 34 is provided to register in turn with the passages 19 in the distributor, after the passages 18 have moved out of register with the port 16, the port 34 being in communication with the port 16 through a passage 35.

In the further modification illustrated in FIGURES 21 and 22 a separate port 36 equivalent to the port 34 is in direction communication, through a passage 37, with the throttle 20. Moreover, the throttle is arranged to determine the quantity of fuel which can be fed to the port 36 according to its axial setting. By this arrangement by a mere change of the throttle plug 20 it can be predetermined whether a light load for a given engine speed should result in advance or retard of injection as compared with a heavy load at the same speed.

Having thus described our invention what we claim as new and desire to secure by Letters Patent is:

1. A variable delivery pump comprising in combination a part provided with a bore, a shuttle slidably mounted in said bore and partly defining first and second fluid-receivable chambers at opposite ends respectively of said shuttle, an inlet for fluid under pressure, adjustable valve means for proportioning simultaneous flow of fluid to said chambers from said inlet, a valve-controlled outlet in communication with the first chamber, at least one reciprocatory plunger which is slidably mounted in the second chamber so as to be movable in one direction during fluid flow to said chambers, and which is movable in the opposite direction for causing movement to be transmitted from said plunger to said shuttle by fluid in said second chamber so that said shuttle causes fluid to be discharged from said first chamber through said outlet, said bore having in communication therewith, at a position intermediate its ends, at least one spill port which is normally covered by said shuttle, but which can be uncovered by said shuttle, when the latter assumes a predetermined position during movement transmitted thereto from said plunger, so as to permit escape of fluid from said second chamber, and thereby terminate discharge of fluid from said first chamber through said outlet.

2. A variable delivery pump according to claim 1, wherein the reciprocatory plunger is also rotatable and forms a distributing valve for controlling the discharge of fluid through the outlet.

3. A variable delivery liquid fuel pump according to claim 1, comprising in combination a stationary body, and a distributor rotatably supported by said body, and constituting the part provided with the bore in which the shuttle is slidably mounted, said bore being formed axially in said distributor, and the latter and said body being provided with passages through which, during rotation of said distributor, fuel can be supplied simultaneously to the first and second chambers under the control of a throttle forming the adjustable valve means.

4. A variable delivery liquid fuel pump according to claim 3, and comprising in combination a stationary annular multi-lobed cam which surrounds a portion of the distributor carrying the plunger in radial relationship thereto, and which serves, during rotation of said distributor, to effect movements of said plunger in the direction for causing fluid to be discharged from the first chamber through the outlet, and means for enabling an additional quantity of fuel to be supplied to the second chamber following termination of fuel supply to said first chamber, said cam having reliefs in advance of its lobes for permitting additional movement of said plunger under the pressure of the fuel supplied to said second chamber.

5. A variable delivery liquid fuel pump according to claim 4, and having a pressure-responsive valve for determining the quantity of additional fuel supplied to the second chamber, said pressure-responsive valve being exposed to, and movable by the pressure of, the fuel supplied to the chambers.

6. A variable delivery liquid fuel pump according to claim 1, comprising in combination a stationary body, a distributor rotatably supported by said body, and constituting the part provided with the bore in which the shuttle is slidably mounted, said bore being formed axially in said distributor, and the latter and said body being provided with passages through which, during rotation of said distributor, fuel can be supplied simultaneously to the first and second chambers under the control of a throttle forming the adjustable valve means, a stationary annular multi-lobed cam which surrounds a portion of said distributor carrying the plunger in radial relationship thereto, and which serves, during rotation of said distributor, to effect movements of said plunger in the direction for causing fuel to be discharged from the first chamber through the outlet, and means for enabling an additional quantity of fuel to be supplied under the control of said throttle to the second chamber following termination of fuel supply to said first chamber, said cam having reliefs in advance of its lobes for permitting additional movement of said plunger under the pressure of fuel supplied to said second chamber.

7. A variable delivery liquid fuel pump according to claim 1, comprising in combination a stationary body, a distributor rotatably supported by said body, and constituting the part provided with the bore in which the shuttle is slidably mounted, said bore being formed axially in said distributor, and the latter and said body being provided with passages through which, during rotation of said distributor, fuel can be supplied simultaneously to the first and second chambers under the control of a throttle which forms the adjustable valve means, and which is both angularly and axially adjustable for determining the quantities of fuel supplied to said chambers.

References Cited in the file of this patent

UNITED STATES PATENTS

| | | |
|---|---|---|
| 2,497,300 | Elliott | Feb. 14, 1950 |
| 2,947,257 | Bessiere | Aug. 2, 1960 |
| 2,950,709 | Bessiere | Aug. 30, 1960 |
| 2,958,290 | Bessiere | Nov. 1, 1960 |